May 18, 1948.  L. W. HILLS  2,441,631
CENTRIFUGAL DUST SEPARATOR
Filed Feb. 14, 1945  6 Sheets-Sheet 1

INVENTOR.
Leslie W. Hills
BY
ATTORNEY

May 18, 1948.    L. W. HILLS    2,441,631
CENTRIFUGAL DUST SEPARATOR
Filed Feb. 14, 1945    6 Sheets-Sheet 2

INVENTOR.
Leslie W. Hills
BY Paul D. Flehr
ATTORNEY

FIG_4D_

FIG_4E_

FIG_17_

FIG_18_

INVENTOR.
Leslie W. Hills
BY
ATTORNEY

May 18, 1948.    L. W. HILLS    2,441,631
CENTRIFUGAL DUST SEPARATOR
Filed Feb. 14, 1945    6 Sheets-Sheet 5

INVENTOR.
Leslie W. Hills
BY
Paul D. Flehr
ATTORNEY

Patented May 18, 1948

2,441,631

UNITED STATES PATENT OFFICE 2,441,631

CENTRIFUGAL DUST SEPARATOR

Leslie W. Hills, San Francisco, Calif., assignor to Hills Bros. Coffee, Inc., San Francisco, Calif., a corporation of California Application February 14, 1945, Serial No. 577,766

5 Claims. (Cl. 183—77)

1

This invention relates generally to apparatus for removal of dust from dust ladened air or other gases. In particular the invention relates to dust separating apparatus of the centrifugal or rotary type, in which centrifugal forces are utilized for effecting the desired separation.

Most industrial equipment for the handling and separating of dust from air or other gases makes use of the conventional cyclone separator. Generally the fan or blower used with the cyclone has its outlet connected to discharge the dust ladened air to the cyclone inlet, although in some installations the outlet of the cyclone connects with the inlet side of the blower. Separating apparatus of this type is relatively inefficient insofar as effectiveness of separation is concerned, and likewise considerable energy is lost due to the loss in pressure head between the inlet and outlet of the cyclone. If it is attempted to secure more efficient separation by higher flow rates to produce more centrifugal effect, this causes a disproportionate increase in the energy loss.

It is an object of the present invention to provide centrifugal dust separating equipment capable of imposing centrifugal separating forces of relatively high order on the dust particles, without however occasioning high energy losses in the system.

Another object of the invention is to provide apparatus of the above character which is capable of imposing relatively high centrifugal forces for a relatively long interval of time, thus promoting high separating efficiency.

A further object of the invention is to provide apparatus in which relatively high air velocities are utilized, as for example movement of the order of 15,000 feet per minute or more, together with means for recovering a substantial amount of energy from the air flow and after removal of dust particles, whereby the net energy input for the system is not excessive compared to the input required for handling an equal amount of air by conventional means and delivering the same at a comparable pressure head.

A further object of the invention is to provide apparatus which is capable of acting both as a highly efficient dust separator and as an air moving fan.

Additional objects of the invention will appear from the following description in which the preferred embodiments have been set forth in detail in conjunction with the accompanying drawing.

Referring to the drawing:

Figure 1 is a side elevational view in section,

2 showing apparatus incorporating the present invention.

The present invention makes use of a dust separating chamber of restricted diameter and substantial length having inflow and outlet openings at its opposite ends. A driven impeller located at the inlet is formed in such a manner as to accelerate and deliver the dust ladened air into the separating chamber at relatively high rotary velocity, as for example velocity of the order of 15,000 feet per minute or more. The separating chamber is provided with an annular opening near its outlet for removing separated dust together with part of the air flow. This material can be passed through a small conventional cyclone separator having its exhaust connected back to the intake of the main separating apparatus to form a closed circuit. Attainment of velocities of the order mentioned requires considerable power, and in order to avoid excessive power consumption discharge means is provided at the outlet end of the separating chamber for recovering a substantial amount of energy from the air flow. In the embodiments to be hereafter described this discharge means utilizes a turbo rotor having blades acted upon by the air leaving the separating chamber, whereby a considerable amount of kinetic energy is recovered and the air finally delivered from the apparatus at a desired pressure head. The gas separating chamber is proportioned so that a very appreciable time interval is provided for adequate and efficient separation of the dust particles under the centrifugal forces to which they are subjected.

Figure 1:
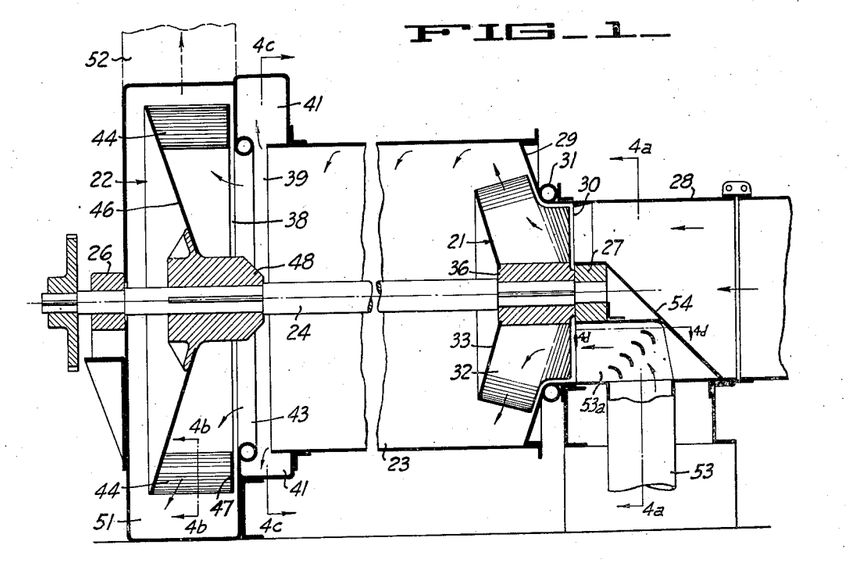
Figure 2:
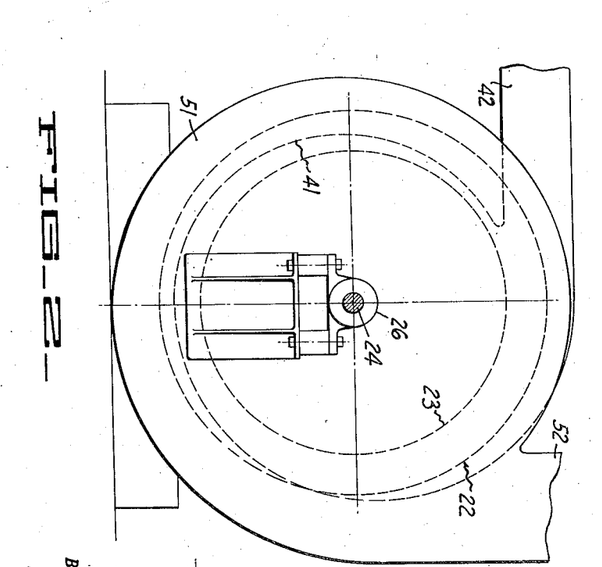
Figure 2 is an end view of the apparatus shown in Fig. 1.

The embodiment shown in Figure 1 consists of a rotary impeller 21, together with a turbo rotor 22. A gas separating chamber 23, which in this embodiment is cylindrical shaped, extends between the impeller and the turbo rotor, and is in axial alignment with the same. In this instance the separating chamber can have a length of from 3 to 4 times its diameter. The impeller and rotor are secured to a common operating shaft 24 carried by suitable bearings 26 and 27, and adapted to be driven by suitable means such as an electric motor.

Conduit 28 serves to supply dust ladened air to the intake opening 30 of the dust separating chamber. This intake opening is circular in contour and is formed in the end wall 29. The point of attachment of conduit 28 within wall 29 is shown reinforced by the circularly bent tube 31.

Figure 3:
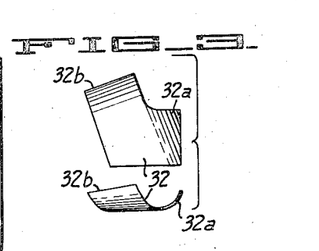
Figures 3 and 4 are details illustrating a desirable method of curving the blades on the intake impeller.
Figure 4:
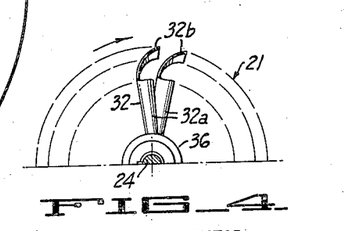

The impeller 21 is constructed in such a manner as to impart a relatively high rotary velocity to air within the separating chamber 23. In this instance the impeller consists of circumferentially spaced blades or vanes 32 attached to the side plate 33 and the hub 36. The hub in turn is keyed to the shaft 24. A suitable form for the blades 32 is shown in Figures 1, 3 and 4. Leading edge portions 32a, on the inlet side of the impeller, are curved forwardly as illustrated, and preferably conform to the surface of a cylinder. The tip portions 32b are curved forwardly, preferably to conform to the surface of a cylinder, in order to give a relatively high rotational velocity to the discharging air. Cylindrical curvature for both the entry and tip portions 32a and 32b provide a blade structure which is easy to manufacture while at the same time having desirable flow characteristics.

Figures 4A, 4B, 4C:
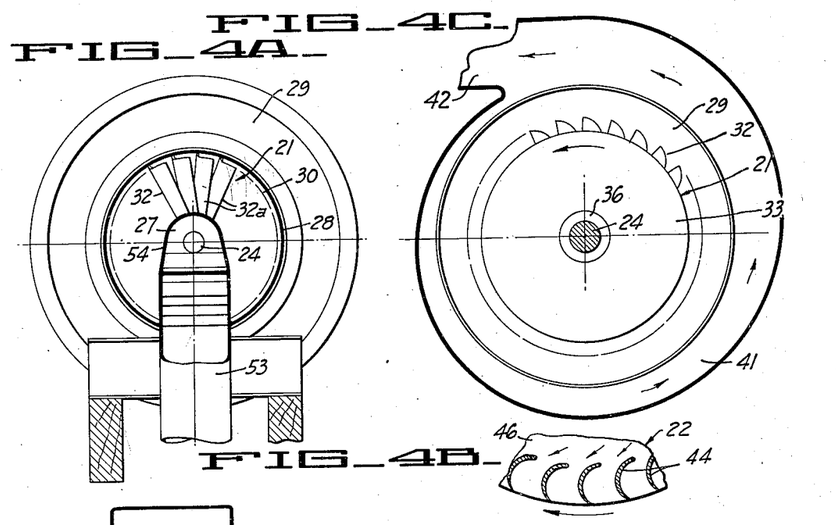
Figure 4a is a cross-sectional detail taken along the line 4a—4a of Figure 1.
Figure 4b is a cross-sectional detail taken along the line 4b—4b of Figure 1.
Figure 4c is a cross-sectional detail taken along the line 4c—4c of Figure 1.

At or near the outlet 38 of the separating chamber 23 there is an annular orifice 39 for removal of separated dust particles. The dust discharging through orifice 39, together with a portion of the air flow, is received in an annular chamber 41, preferably formed in the shape of a volute (Figure 4c) and provided with a tangentially connected discharge conduit 42. In the particular detail construction indicated orifice 39 is formed between the end edge of the separating chamber 23 and a circular reinforcing tube 43.

The turbo rotor 22 in this instance consists of circumferentially spaced blades 44 which are carried by the end plate 46 and the retaining ring 47. End plate 46 is attached to the hub 48, which in turn is keyed to the shaft 24. Blades 44 are curved backwardly with respect to both entrance and exit edges (Figure 4b), so that rotating air discharging from the separating chamber acts upon the vanes to impart considerable rotational torque to the turbo rotor and the shaft 24, particularly when handling relatively large volumes of air. In this manner considerable energy is recovered and at the same time the absolute velocity of the air delivered from the blades of the turbo rotor is greatly reduced.

Surrounding the turbo rotor 22 there is a casing 51 which is likewise preferably formed as a volute, and is provided with a tangential discharge pipe 52. The use of a volute in this manner serves to convert the kinetic energy of the air streams delivered by the turbo rotor, to the desired pressure head in the discharge conduit 52, without undue loss of energy.

Figure 4D:
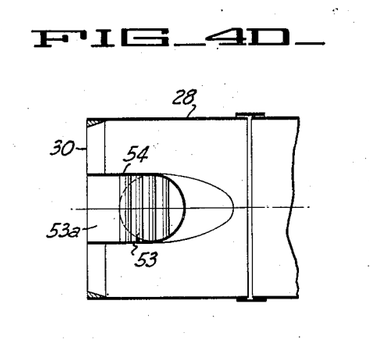
Figure 4d is a cross-sectional view taken along the line 4d—4d of Figure 1.

While the apparatus described above is operable by itself, it is desirable in commercial installations to connect the conduit 42 with some suitable secondary dust collector, such as a dust separator or collector of the cyclone type. Because such a cyclone may not efficiently remove dust, the exhaust from the same is preferably connected back to the intake side of the system, as will be presently explained in greater detail. To facilitate return from the secondary cyclone I have shown a return conduit 53 connected to an L 53a through the lower side of the conduit 28. A shroud or hood 54 with a rounded nose (Figure 4d) is shown immediately below the bearing 27 and about the L 53a. This construction permits the passage of foreign materials such as strings, shavings and the like, without possibility of obstructing the entrance to the impeller 21 because of fouling of such material on the bearing support.

Figure 4E:
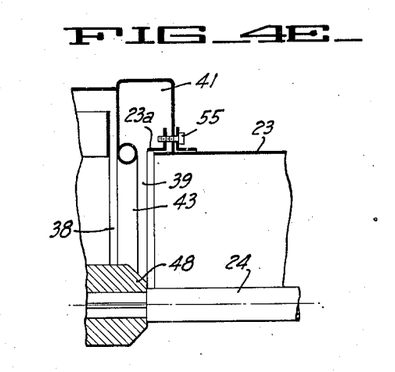
Figure 4e is a cross-sectional detail showing a modification of Figure 1 for adjusting the orifice 39.

As shown in Figure 4e the orifice 39 may be made adjustable. Thus in this instance a sliding ring 23a is provided on conduit 23 and the position of this ring can be adjusted by suitable means such as the screws 55. Such adjustment serves to vary the proportionate amount of air discharged with dust through orifice 39.

The apparatus described above operates as follows: Shaft 24 is driven at a suitable speed dependent upon the separating requirements, the operating head and upon the construction of the impeller and turbo rotor. In general it is desirable that the speed be such that the rotational velocities created in the separating chamber 23, are of the order of say 15,000 feet per minute or more. Within the separating chamber the air currents swirl in a rotary direction and also progress through the chamber toward the turbo rotor 22. In other words the locus of an imaginary point in this air flow is substantially a helix. Within the separating chamber dust particles are subjected to relatively high centrifugal forces whereby they are impelled outwardly in close proximity with the inner periphery of the chamber walls. Dust particles are largely concentrated in an outer layer or zone of the air flow. Near the outlet end of the separating chamber the zone of air just mentioned is caused to discharge through the annular orifice 39 into the volute 41. The amount of the air flow diverted in this manner may be from 5 to 10% or more of the flow entering the impeller 21, depending on the desired efficiency of dust collecting, and may be adjusted by the provision of suitable means for adjusting the width of orifice 39 (Figure 4e) and/or by throttling means in the conduit leading to the cyclone, as will be presently explained in connection with Figure 9a. This material immediately passes to the secondary cyclone or collector, where a large part of the dust is removed and collected, and the remaining air with some dust particles then returned by way of conduit 53. The bulk of the air which does not pass through orifice 39 acts upon the blades of the turbo rotor 22, whereby the rotary velocity of the air currents is greatly reduced and a very substantial amount of mechanical energy is returned to the system. Air discharged into the volute 51 produces a desirable and usable pressure head in the final discharge conduit 52.

It will be evident from the above that the equipment described makes possible highly efficient centrifugal separation of dust particles, without wasteful energy consumption. Efficiency of centrifugal separation is made possible not only because of the high rotational velocities which produce a high centrifugal effect, but because the dust particles during separation and removal are not caused to pass through zones of excessive turbulence or through air currents traveling in directions differing from the desired direction of movement of the particles. In addition the proportioning of the separating chamber insures a very substantial time interval during which the dust particles are subjected to centrifugal forces and before the separated particles are removed through the annular orifice 39. Higher air velocities, say 30,000 feet per minute, may make necessary a careful streamlining of the rotor blades for higher efficiency, even to the point of approaching the exacting curvatures of an air foil section.

Figure 5:
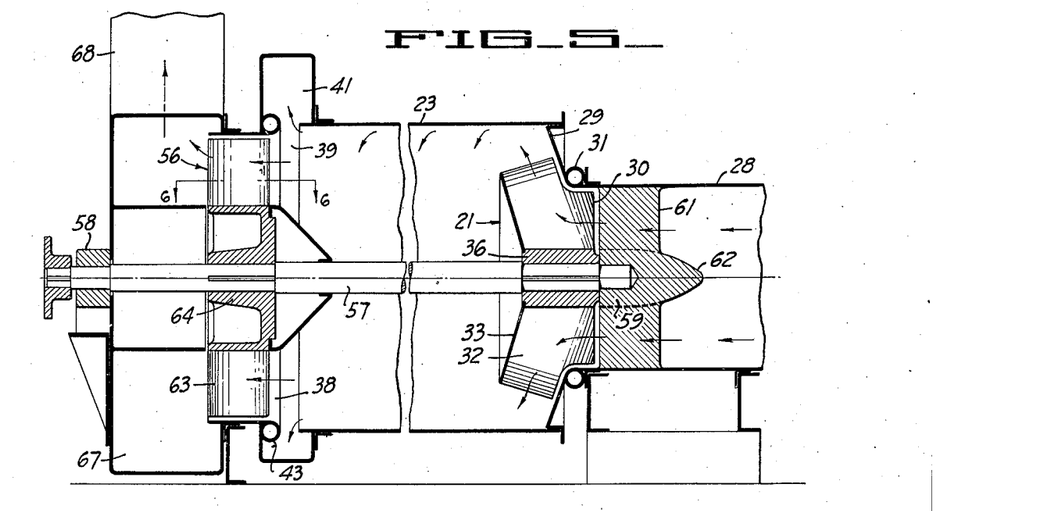
Figure 5 is a side elevational view in section, illustrating a modified embodiment of the invention differing from Figure 1 particularly in the construction of the outlet or discharge turbo rotor.

In the embodiment of Figure 5 the impeller 21 and the turbo rotor 56 are mounted upon the shaft 57, as explained for Figure 1. Shaft 57 is carried by the bearings 58 and 59, and the latter bearing is preferably carried by the radially extending vanes 61. These vanes are preferably formed to provide a cross-sectional contour more or less similar to an aerofoil, in order to provide a minimum of air flow resistance. Likewise a streamlined shrouding 62 is provided for the bearing 59 and for the hub 36 of the impeller 21.

Figures 6, 7, 8:
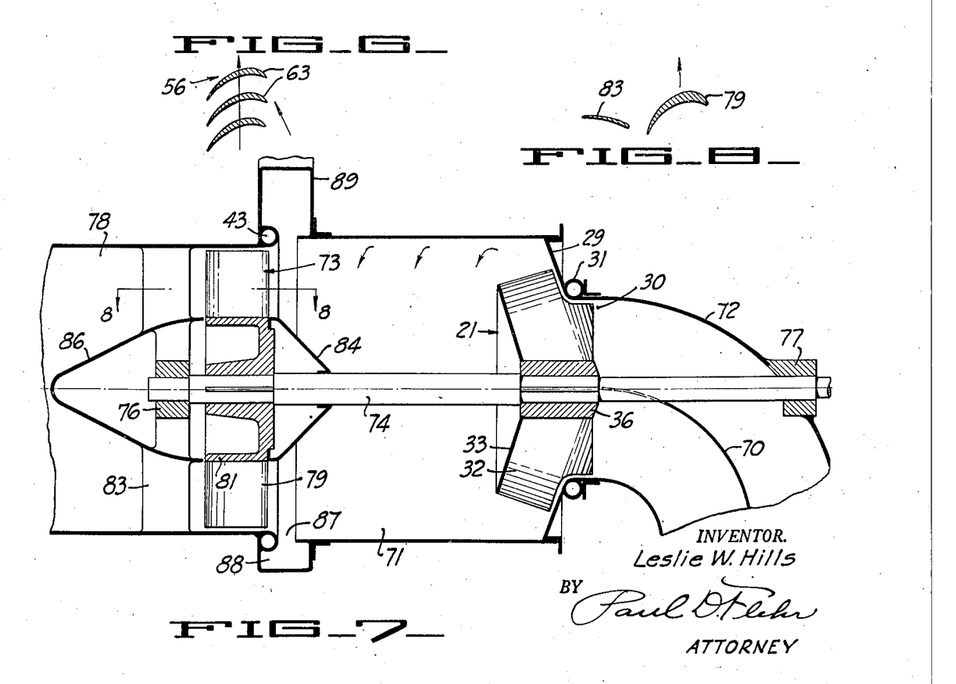
Figure 6 is a diagrammatic detail illustrating a desirable curvature of the vanes or blades for the discharge turbo rotor.
Figure 7 is a side elevational view in section, illustrating a further embodiment of the invention characterized by use of aligned intake and outlet openings.
Figure 8 is a diagrammatic detail in section, showing a desirable arrangement and curvature of blades and vanes, for the energy recovering discharge means.

Blades 63 for the turbo rotor 56 are spaced circumferentially and are mounted on the hub 64. These blades can be shaped substantially as shown in Figure 6, in order to be acted upon effectively by the air currents leaving the separating chamber, to thereby efficiently recover energy for the system. It will be noted that the impeller in this instance is constructed for straight through axial flow of air. Air delivered from the blades of the turbo rotor is received in the shell or volute casing 67, and finally delivered to the tangentially connected discharge conduit 68.

The embodiment of Figure 5 operates in substantially the same manner as Figure 1. Energy is recovered from the air flow while the air is moving axially of the shaft 57, and without the necessity of first moving outwardly as in Figure 1. It will be noted that Figure 5 is not provided with a conduit comparable to the conduit 53 of Figure 1. Therefore if it is desired to effect a return from the secondary separator, this return should be at some suitable point to the inlet side of the apparatus, as for example to the conduit 28.

Figure 7 illustrates another form of the invention which avoids the necessity for the discharge shell or volute 51 of Figure 1, or 67 of Figure 5. In this instance the gas separating chamber 71 is made similar to the separating chamber previously described, except that it is shown somewhat shorter in length. A curved or elbow-shaped conduit section 72 having a division plate 70 is shown connected to the inlet opening of the separating chamber. Both the impeller 21 and the turbo rotor 73 are mounted upon the common shaft 74, which in turn is carried by the bearings 76 and 77. Turbo rotor 73 together with bearing 76 is within a conduit 78, which is aligned with impeller 21 and the gas separating chamber 71 and which is in effect a portion of a discharge conduit. Conduit 78 should preferably be extended to a length of about 3 to 4 times its diameter in order to obtain maximum conversion of velocity head to pressure head. The turbo rotor 73 consists of circumferentially spaced blades 79 which are carried by the inner hub 81. Bearing 76 is supported by a plurality of radially extending and circumferentially spaced vanes 83, which engage air currents leaving the blades 79. Shrouds 84 and 86 are provided for the hub 81, and the bearing 76, and these parts are streamlined to present a minimum of air flow resistance.

A suitable shaping for the rotor blades 79 and the stationary vanes 83 is shown in Figure 8. Blades 79 are shaped to be engaged by the rotating air currents leaving the separating chamber 71, whereby the rotary velocity is reduced to substantially zero and absolute velocities of these air currents are greatly reduced to thereby recover energy for the system. Air leaving the blades 79 retains some rotary velocity under optimum or normal flow conditions, but upon engaging the vanes 83, the direction of movement is changed whereby the air leaving these vanes flows axially of the conduit 78. Thus a desired static pressure head is efficiently maintained within the conduit 78, sufficient for example to convey the air flow to other parts of a pneumatic system with which my apparatus is employed. The spacing between blades 83 should be about one-half to one-fourth their length as measured in the direction of the axis of rotation.

The remainder of the apparatus shown in Figure 7 is similar to the embodiments previously described. Dust centrifugally separated out in chamber 71 is removed through the annular orifice 87 and is received in the volute 88. From this volute dust is removed through conduit 89, which may lead to a secondary cyclone as previously described.

Figures 9, 9A:
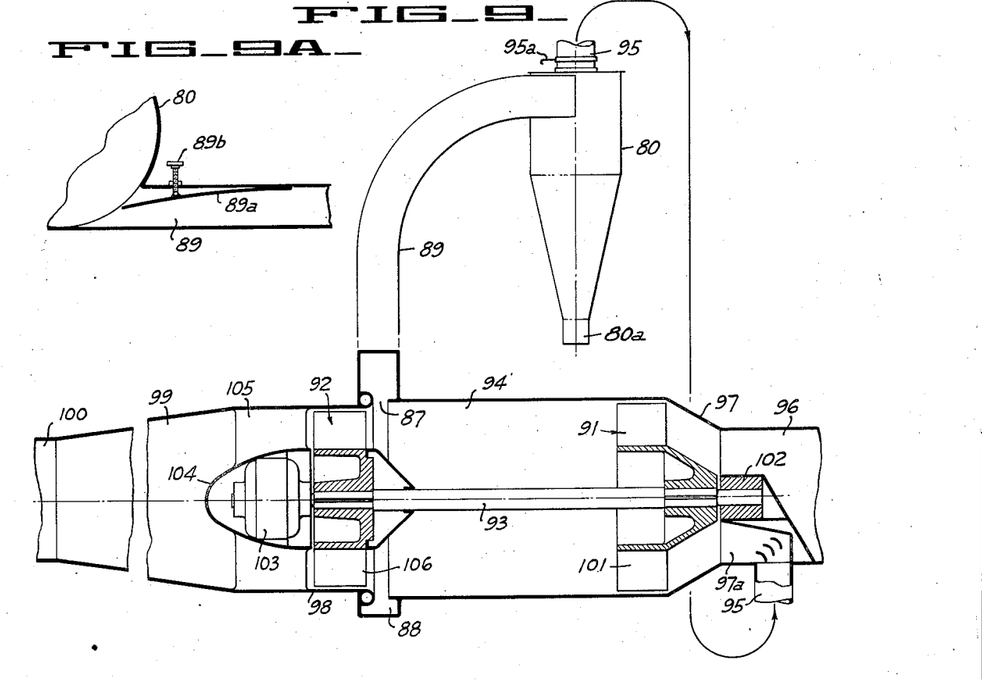
Figure 9 is a side elevational view in section, illustrating a type of apparatus somewhat similar to Figure 7, but modified in certain respects, particularly in connection with the intake impeller.
Figure 9a shows a suitable throttling arrangement which can be utilized in conjunction with conduit 89 of Figure 9.

The embodiment of Figure 9 is somewhat similar to Figure 7, except that an axial flow type of impeller has been employed. Also in this instance the secondary cyclone is illustrated, together with a connection for reintroducing the exhaust of the secondary cyclone back into the intake of the impeller. Thus in this instance the impeller 91 and the turbo rotor 92 are mounted upon the common shaft 93. The shaft 93 is axially aligned with the cylindrical gas separating chamber 94. Inflow conduit 96 connects with the inlet end of the gas separating chamber 94, through the flared or expanding section 97, and the shell 98 surrounding the turbo rotor 92 connects with the conduit section 99, and from thence to the discharge conduit 100. Annular orifice 87, volute 88, and discharge conduit 89 are the same as Figure 7. A secondary cyclone separator 80 has its inlet connected to conduit 89, and its exhaust connected to a conduit 95 which communicates with the lower side of conduit 96. Within the conduit 96 there is a shrouding to form a passage 97a leading from conduit 95, and serving to deliver the returned air to the intake of the impeller 91. The differential pressure across the cyclone is relatively high with resulting high flow velocities through the same, thus contributing to its efficiency of separation. In fact the pressure differential across the cyclone is in excess of the overall pressure differential across the unit because of the high velocity of air discharged through dust conduit 89.

Figure 9a illustrates throttling means which can be utilized in conjunction with conduit 89 for the purpose of controlling the amount of air diverted from the main separating chamber to the cyclone 80. Briefly this throttling means consists of a movable deflecting plate or baffle 89a which can be adjusted by suitable means such as the screw 89b. Thus the discharge end of the conduit 89 can be varied with respect to the cross-sectional flow area afforded, in order to correspondingly vary the amount of dust ladened air passing through the conduit 89. It will be noted that this method of control increases the efficiency of separation of the cyclone 80 because all of the flow is delivered tangentially near the periphery of the cyclone chamber, and because the velocity head developed by throttling is effectively used in the cyclone. A means to control the operational pressure in the cyclone is afforded in the outlet control gate 95a. By adjusting this gate one may obtain a substantially atmospheric pressure at the dust outlet 80a at the bottom of the cyclone cone and permit the precipitated dust to fall into an open container.

The impeller 91 in this instance utilizes the curved circumferentially spaced blades 101. As diagrammatically indicated in Figure 10 these blades are formed to provide a forwardly curved discharge lip, thereby making possible a relatively high rotative velocity for air leaving the blades.

Figures 10, 11:
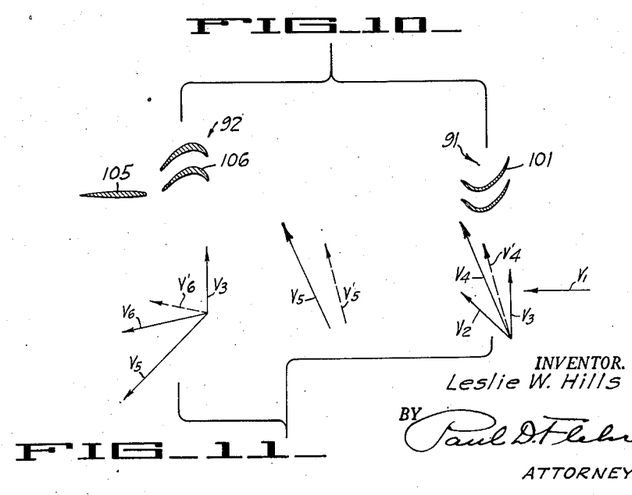
Figure 10 is a diagrammatic sectional detail, illustrating suitable contouring in arrangement of blades for the impeller and turbo rotor of Figure 9.
Figure 11 is a vector diagram serving to explain Figure 10.

The shaft 93 is shown with its one end carried by the bearing 102 and its other end coupled to the electric motor 103. Motor 103 is provided with a streamlined shrouding 104 and is supported by the radially extending stationary vanes 105. The number of vanes 105 is preferably incommensurate with the number of blades 106 on the rotor 92. Suitable shaping of the vanes 105, and also the blades 106 of the turbo rotor 92, is illustrated in Figure 10. Here again the shaping of the blades for the turbo rotors is such as to recover energy from the rotating air leaving the gas separating chamber, while the stationary vanes 105 serve to deflect the air flow leaving the blades of the turbo rotor and to direct the same longitudinally of the conduit section 99. This arrangement together with the tapered construction of conduit section 99 insures effective building up of a desired pressure head in conduit 100.

Figure 10 together with the vector diagrams of Figure 11 serves to illustrate movement of air through the apparatus of Figure 9 for two assumed inflow rates, one being a given maximum value and the second being an assumed lower value. In both Figures 10 and 11 it is assumed that the movement of the blades 101 and 106 is upwardly, or in other words as Figure 9 is viewed from the right the rotation is clockwise. Vector V1 at the right hand end of Figure 11 represents the direction and absolute velocity of air at the intake of the first rotor 91 at an assumed maximum value. Vector V2 represents the direction and velocity of the air flow relative to the blades 101, and as the air flow is leaving these blades. Vector V3 represents the blade velocity. Vector V4 represents the direction and absolute velocity of air flow leaving the blades. Vector V'4 is likewise the direction and absolute velocity of air flow leaving the blades, but in this instance the velocity is for an assumed inflow rate somewhat less than that represented by vector V1. Vectors V5 and V'5 likewise represent absolute velocity and direction of air flow within the separating chamber 94, for both the maximum and assumed lower rates. Vector V3 as it appears near the left hand end of Figure 11 again represents the velocity of blades 106. Vector V5 represents the velocity and direction of flow leaving blades 105, relative to the blades. Vector V6 represents the absolute velocity and direction of air flow leaving the blades 106. Vector V'6 represents the velocity and direction of air flow leaving the blades for the assumed lower capacity. It will be noted that both vectors V6 and V'6 are at minor angles with respect to the stationary vanes 105. Therefore for the assumed maximum and reduced inflow rates vanes 105 will act upon the airflow with a minimum amount of change in direction of flow, to cause effective conversion of velocity to pressure head within conduits 99 and 100. Likewise with the flow rates and direction of flow represented by the vector diagram of Figure 11, vanes 105 can be substantially straight and substantially parallel to the axis of shaft 93 except for streamlining of the same to reduce flow resistance and turbulence.

In actual practice the pressure head to which the device discharges (i. e. pressure head in conduit 100 of Figure 9) may vary from time to time or in different installations. In general with an increase in such pressure head the flow rates are reduced and this results in an increase in the number of turns the path of the air takes in passing through the separating chamber to the annular dust discharge orifice.

With the embodiments described above, the turbo rotor for normal capacities or flow rates between given maximum and minimum values will at all times be acted upon by the air in such a fashion as to recover energy. However it should be noted that with an arrangement such as shown in Figure 9, at high delivery heads and with abnormally low flow rates the turbo rotor 92 will not recover energy but will in effect assist rotor 91 in building up the desired discharge head.

This holds true with greater effect for the annular discharge turbo rotor 46 of Figure 1.

Figures 12, 13:
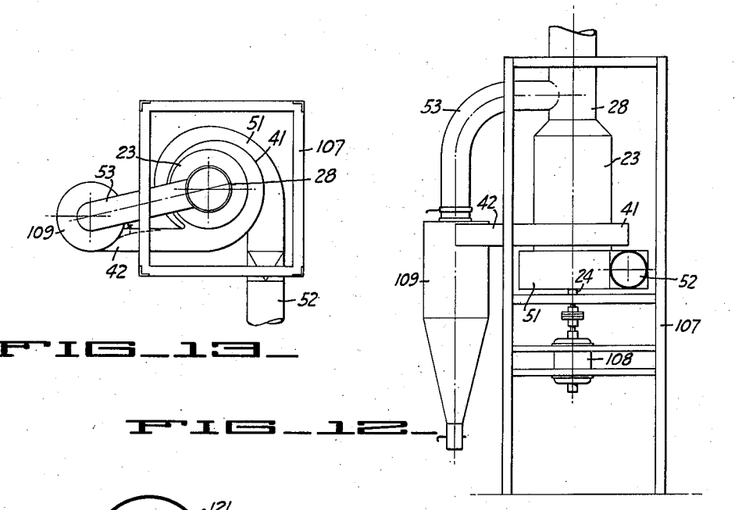
Figure 12 is a side elevational view showing a vertical type of mounting with a secondary cyclone, for the embodiment of Figure 1.
Figure 13 is a plan view of the arrangement shown in Figure 12.

Figure 12 illustrates apparatus like Figure 1 mounted in a vertical position in conjunction with a secondary cyclone separator. Thus in this instance a suitable frame 107 serves to support the apparatus of Figure 1, and an electric motor 108 is directly connected to the operating shaft 24. Conduit 42 is connected to the intake side of the cyclone separator 109, the exhaust of which connects with a conduit 53. Figure 13 illustrates the arrangement of Figure 12 in plan. It will be understood that the arrangement of Figures 12 and 13 can likewise incorporate the throttling arrangement previously described with reference to Figure 9a.

Figure 14:
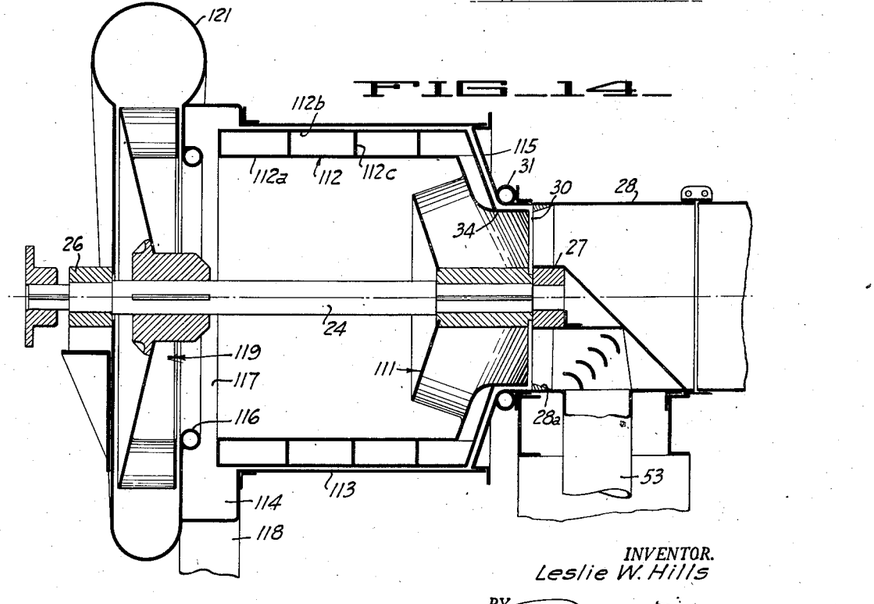
Figure 14 is a side elevational view in section of a further embodiment, in which the separating chamber rotates together with the intake impeller.

Figure 14 illustrates another embodiment of the invention having certain parts similar to Figure 1, but utilizing a rotating rather than a stationary separating chamber. Thus in this instance impeller 111, mounted upon shaft 24, has blades formed similar to the impeller 21 of Figure 1, and directly mounted upon this impeller there is a cylindrically shaped dust separating chamber 112. To provide sufficient strength to withstand centrifugal forces, this chamber can be formed of separate inner and outer cylindrical walls 112a and 112b which are attached together by webs or ribs 112c. The chamber is completely enclosed by the stationary housing 113, which has an end wall 115 connecting with the inlet conduit 28. Collar 28a has a minimum amount of clearance with respect to the impeller in order to reduce leakage back to the intake. The other end of housing 113 connects with the volute 114, corresponding to volute 41 of Figure 1, and terminates short of the adjacent end of the rotary separating chamber 112. The free end of rotating chamber 112, that is the end remote from the impeller 111, is spaced from the adjacent circular portion 116 to form the orifice 117 through which separated dust is discharged. The separated dust is received in the volute 114 and is discharged through the tangentially connected conduit 118. Turbo rotor 119 is also mounted on shaft 24 and is acted upon by air flow leaving the separating chamber, after which the air passes to the volute 121.

While the rotating separating chamber shown in Figure 14 involves additional manufacturing costs, it is capable of more efficient separating action because it minimizes relative movement and resulting turbulence between the inner surface of chamber 112 and the rotating air currents. Air can be delivered from the blades of the impeller 111 at a speed no higher than that necessary to convey precipitated dust along the inner surface 112 thereby minimizing the turbulence of the air next to the surface 112. Therefore the chamber rotates concurrently with the gases being subjected to centrifugal force, thereby minimizing any tendency to form a zone of turbulence adjacent the inner wall of the separating chamber.

It will be appreciated that the rotor type of gas separating chamber, as shown in Figure 14, can likewise be incorporated with the other embodiments described in which a turbo rotor is utilized to recover energy.

Figure 15:
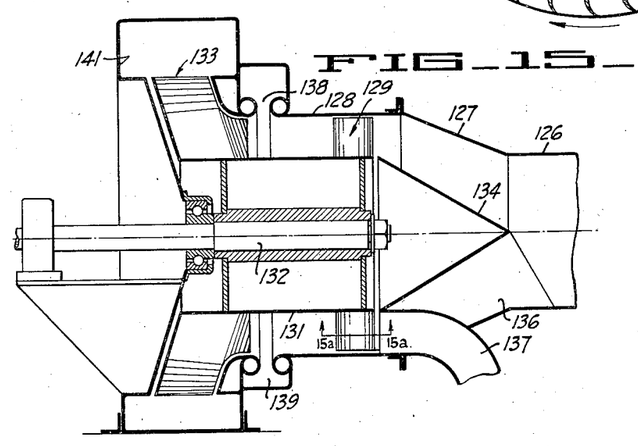
Figure 15 is a side elevational view illustrating a further embodiment of the invention.
Figure 15A:
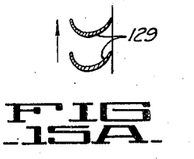
Figure 15a is a cross sectional detail taken along the line 15a—15a of Figure 15.

That form of the invention shown in Figure 15 is somewhat more compact and simpler in design than the embodiments previously described. Intake conduit 126 in this instance connects with the divergent conical section 127 which in turn connects to the inlet end of the separating chamber 128. The impeller 129 can be made of vanes shaped as shown in Figure 15a. Instead of using the conventional hub as in Figure 9, these blades are secured to a drum 131 which in turn is mounted upon the shaft 132. Drum 131 also serves to carry the vanes for the turbo rotor 133 which can be shaped similar to the blades for the impeller 21 of Figures 5 and 7 but with the curvatures arranged to recover energy. The intake end of drum 131 is streamlined by the stationary conical shaped member 134, which is retained in place by suitable means such as the web 136. Conduit 137 is provided for the return of dust ladened air from the external cyclone. Dust separated in chamber 128 passes through the annular orifice 138 which discharges into the volute 139 as previously described. The turbo rotor 133 likewise discharges into the volute 141 which connects tangentially with a discharge conduit. Shaft 132 is rotated by suitable means such as a directly connected electric motor.

Figure 16:
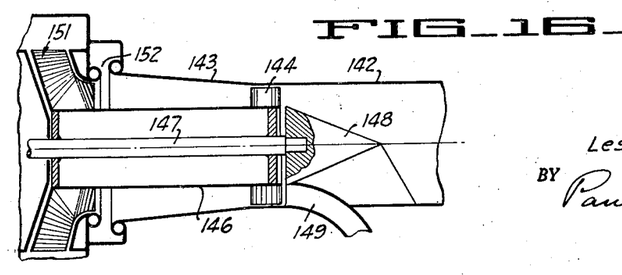
Figure 16 is a side elevational view illustrating another embodiment of the invention in which the separating chamber is tapered or conical, instead of conforming to the surface of a cylinder.

Figure 16 illustrates an embodiment somewhat similar to Figure 15 but modified with respect to the shaping of the gas chamber 128. In this instance the inlet conduit 142 connects with the inlet end of the gas separating chamber 143, which has a slight taper. The impeller 144 is mounted upon a drum 146 which in turn is mounted upon the shaft 147. Drum 146 in this instance is somewhat longer than in Figure 15. A member 148 corresponds with member 134 of Figure 15 and in this instance it forms a bearing for the inlet end of shaft 147. A return conduit 149 is also provided corresponding to the conduit 137 of Figure 15. Turbo rotor 151 can be substantially the same as rotor 133 of Figure 15. The enlarged end of gas separating chamber 143 is arranged to discharge separated dust through the annular orifice 152, in a similar manner to orifice 138 of Figure 15.

Figure 17:
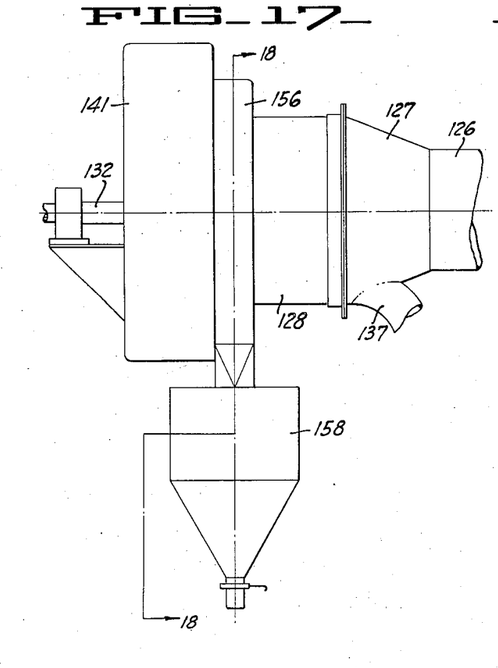
Figure 17 is a side elevational view illustrating another embodiment of the invention in which the use of an external cyclone is omitted.
Figure 18:
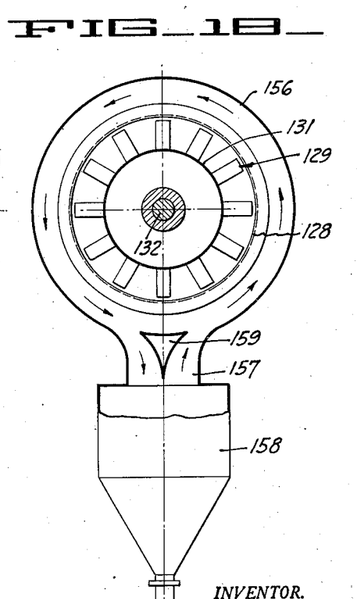
Figure 18 is a cross-sectional view taken along the line 18—18 of Figure 17.

Figures 17 and 18 show an embodiment in which an external cyclone is omitted. The main part of the device in this instance is made as in Figure 15 but in place of volute 139 there is an annular chamber 156 having a side connection with a conduit 157 leading to the dust collecting receiver 158. A deflector 159 serves to split and direct the flow as indicated whereby dust is deposited into receiver 158. Therefore in this modification there is no bypassing of air back to the inlet.

It will be appreciated that various types of materials can be utilized in constructing the foregoing embodiments of the invention. Where the dust particles being carried by the air flow are abrasive in character, the walls of the separating chamber can be lined with suitable resilient material such as natural or synthetic rubber. Likewise various coating materials can be applied to the surfaces of the various parts exposed to the air flow, as for example coatings of thermo-plastic resins or like synthetic materials.

I claim:

1. In centrifugal dust separating apparatus, a separating chamber having spaced inlet and outlet openings at its opposite ends, a driven impeller disposed near the inlet end of the chamber and having its axis coincide with the axis of the chamber, said chamber being mounted to rotate in unison with the impeller, said impeller being constructed to deliver dust ladened air to the separating chamber with relatively high rotary velocity about the axis of the chamber, said rotary velocity being in excess of the peripheral velocity of the impeller, and means located at the outlet of said chamber serving to remove centrifugally separated dust from the chamber together with a minor portion of the air flow.

2. In a combined fan and dust separator a rotor with forward curved blades adapted to receive a stream of air, a dust separating chamber arranged to receive air from the rotor and including a dust outlet, and a second rotor with backward curved blades located on the opposite side of said dust outlet from said first rotor and adapted to handle all or a portion of the air stream discharged by the first rotor said second rotor being mounted in driving relation to the first rotor.

3. In centrifugal dust separating apparatus, a separating chamber having spaced inlet and outlet openings at its opposite ends, a driven impeller located near the inlet and serving to deliver dust ladened air into the separating chamber with relatively high rotary velocity about the axis of the chamber, the impeller having blades extending forwardly in the direction of air flow therethrough so that said rotary velocity is in excess of the peripheral velocity of the impeller, means located at the periphery of the chamber near the outlet end of the same for removing centrifugally separated dust together with a portion of the air flow, said means being spaced in an axial direction from the impeller, and discharge means including a turbo rotor acted upon by air current discharging from said chamber and serving to effectively recover energy from the same.

4. In centrifugal dust separating apparatus, an impeller adapted to be driven and adapted to impart relatively high rotary velocity to air acted upon by the same, the impeller having blades extending forwardly in the direction of air flow therethrough so that said rotary velocity is in excess of the rotary velocity of the impeller, a turbo rotor substantially aligned with the axis of the first impeller but spaced laterally from the same, said rotor having blades formed whereby rotary air currents acting upon the same serve to impart rotary torque to the rotor, and a dust separating chamber interposed between the impeller and the rotor.

5. In centrifugal dust separating apparatus, an impeller adapted to be driven and adapted to impart relatively high rotary velocity to air acted upon the same, the impeller having blades extending forwardly in the direction of air flow therethrough so that said rotary velocity is in excess of the peripheral velocity of the impeller, a turbo rotor substantially aligned with the axis of the first impeller but spaced laterally from the same, said rotor having backwardly curved blades whereby rotary air currents acting upon the same serve to impart rotary torque to the rotor, a dust separating chamber interposed between the impeller and the rotor, and an annular orifice or opening at the discharge end of the chamber and spaced axially from the impeller.

LESLIE W. HILLS.

REFERENCES CITED

The following references are of record in the file of this patent:

UNITED STATES PATENTS

| Number | Name | Date |
|---|---|---|
| 709,527 | Theisen | Sept. 23, 1902 |
| 2,247,528 | Sylvan | July 1, 1941 |
| 2,258,901 | Lykken | Oct. 14, 1941 |
| 2,269,412 | Sturtevant | Jan. 6, 1942 |

FOREIGN PATENTS

| Number | Country | Date |
|---|---|---|
| 570,855 | Germany | Feb. 21, 1933 |
| 573,905 | Germany | Apr. 7, 1933 |

Certificate of Correction

Patent No. 2,441,631.

May 18, 1948.

LESLIE W. HILLS

It is hereby certified that error appears in the printed specification of the above numbered patent requiring correction as follows: Column 10, line 65, for the word and hyphen "out-" read *outlet*; and that the said Letters Patent should be read with this correction therein that the same may conform to the record of the case in the Patent Office.

Signed and sealed this 12th day of October, A. D. 1948.

[SEAL]

THOMAS F. MURPHY,
*Assistant Commissioner of Patents.*